United States Patent [19]

Wilkins

[11] Patent Number: 4,525,931

[45] Date of Patent: Jul. 2, 1985

[54] GAGE ASSEMBLY

[75] Inventor: Larry C. Wilkins, New Albany, Ind.

[73] Assignee: Electromechanical Research Laboratories, Inc., New Albany, Ind.

[21] Appl. No.: 528,550

[22] Filed: Sep. 1, 1983

[51] Int. Cl.³ .............................................. G01B 3/38
[52] U.S. Cl. ................................ 33/147 T; 33/147 H; 33/147 J
[58] Field of Search ............. 33/147 T, 147 J, 147 R, 33/147 F, 147 E, 147 H, 143 R, 143 M, 147 K

[56] References Cited

U.S. PATENT DOCUMENTS

| | | | |
|---|---|---|---|
| 1,664,583 | 4/1928 | Wheelock | 33/147 H |
| 1,725,898 | 8/1929 | Chaperlo et al. | 33/147 H |
| 2,524,256 | 10/1950 | Greany | 33/147 R |
| 2,685,136 | 8/1954 | Imshaug | 33/147 J |
| 3,235,968 | 2/1966 | Wertepny | 33/147 J |

Primary Examiner—Willis Little
Attorney, Agent, or Firm—Woodard, Weikart, Emhardt & Naughton

[57] ABSTRACT

A dial indicator gage is mounted to a bar of sufficient length to measure across a part of a certain size. The bar has holes spaced along it for adjustably positioning an anvil carrier at a distance from the indicator plunger which is sufficient to measure a part of the size involved. A handle-operated plunger retractor retracts the indicator plunger into a cavity when the gage assembly is lifted to move it onto a part or off a part to thereby avoid possible damage to the plunger.

11 Claims, 4 Drawing Figures

4,525,931

GAGE ASSEMBLY

BACKGROUND OF THE INVENTION

1. Field of the Invention

This invention relates generally to measuring gages for sheet metal, plate or bar type parts, and more particularly to a gage which is readily adjustable to permit measuring different parts in different ranges of size, and yet measure them with a high degree of precision.

2. Description of the Prior Art

Various gages for measuring outside dimensions of manufactured parts, are well known. Micrometer calipers are probably best known. There is some inconsistency in measurement resulting from their use. This is due to differences from one inspector to another, or in an individual inspector from one time to another, in the feel of tightness of the gage on the part during the taking of the measurement. Efforts to avoid these differences have resulted in the development of air gages. These are a bit cumbersome and expensive for certain uses, and generally result in high volume dedicated-measurement stationary applications. Another, more portable device, involves a dial indicator on a bar, with a pair of buttons on the bar opposite the dial indicator plunger, to cooperate with the plunger to provide a three point contact with the part being measured by the indicator. These are not readily adjustable to significantly different ranges of measurement. The present invention is directed to solving the problems associated with the prior art measuring devices.

SUMMARY OF THE INVENTION

Described briefly, according to a typical embodiment of this invention, a part-bridging bar is provided to support at spaced locations, an anvil to engage one margin of a part to be measured, and a dial indicator gage positioned to engage the plunger thereof with the opposite margin of the part. A plunger retractor assembly is mounted at one end of the bar to retract the dial indicator plunger when the gage assembly is lifted to place it onto the part to be measured or to remove it from the part to be measured. The anvil is mounted to a carrier which is slidable along the bar. The carrier is secured to the bar in any desired longitudinal position thereon, by a knob-operated clamp. The locations are established by precision fit of dowel pins of the carrier assembly in precision apertures in the bar.

DESCRIPTION OF THE PREFERRED EMBODIMENT

Figure 1:
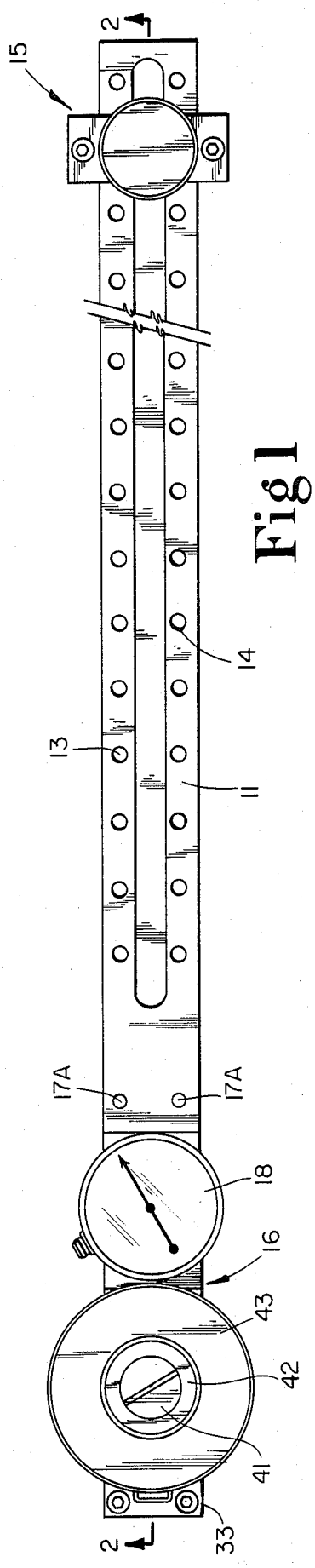
FIG. 1 is a top plan view of a gage assembly according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2A:
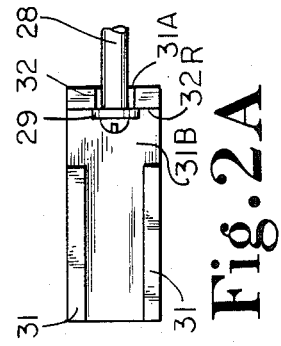
FIG. 2A is an enlarged bottom view of the retracting block.
Figure 2:
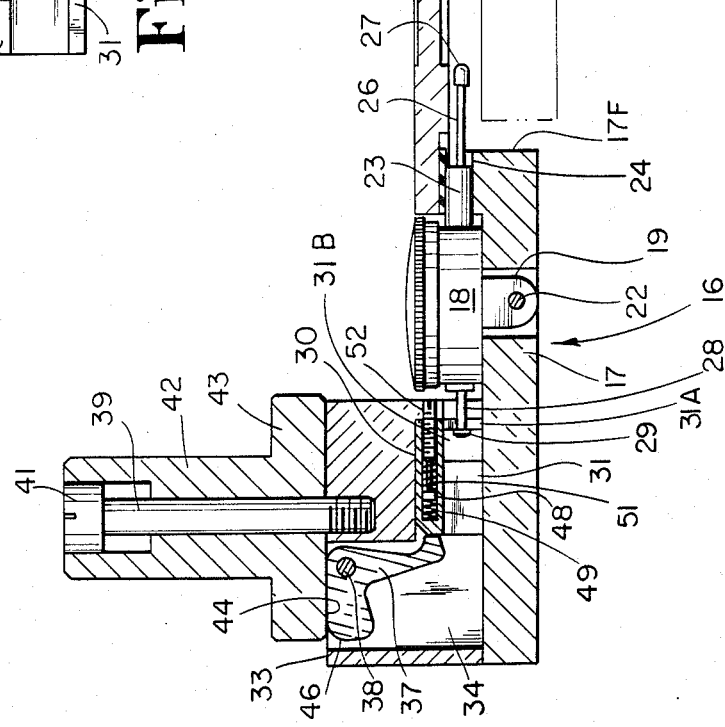
FIG. 2 is a longitudinal section through the assembly, the section being taken on line 2—2 in FIG. 1 and viewed in the direction of the arrows.
Figure 3:
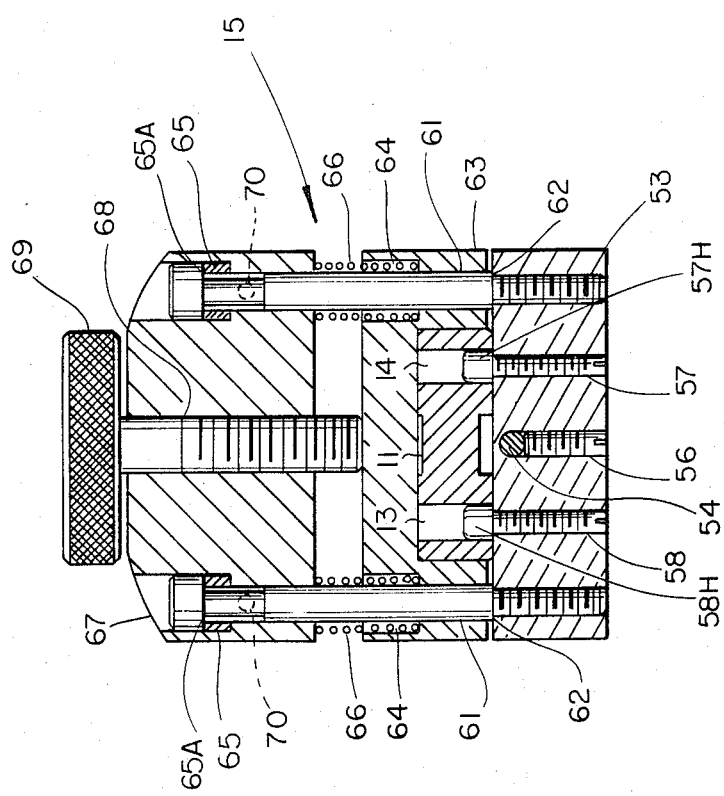
FIG. 3 is a section through the anvil carrier assembly, the section being taken at line 3—3 in FIG. 2 and viewed in the direction of the arrows.

Referring to the drawings in detail, the gage assembly includes the bar 11, which can be of any desired length to adequately span or bridge the largest part (shown dotted at 12 in FIG. 2) which is to be measured. It has two rows of precisely sized and longitudinally spaced apertures 13 and 14. An anvil and carrier assembly 15 is provided on the bar, and will be described in detail hereinafter.

An indicator and retractor assembly 16 are provided at one end of the bar 11. This includes a base mounting block 17 fastened to the bar by the cap screws 17A. This block 17 receives the dial indicator gage 18 whose mounting post 19 is received snugly in an aperture in block 17 and secured in the block 17. The post is retained in the block by the screw 22 recieved through the wall of the block 17. The indicator plunger guide 23 is received in the cavity or groove 24 in the block 17. The plunger 26 extends from the end of the guide 23 and is terminated by the tip 27. The opposite end of the plunger is shown at 28, and has a head 29 thereon.

According to one feature of this invention, there is an automatic plunger retractor. This includes a plunger retractor block 30 having longitudinally extending side legs 31 and a transverse front leg 32 slidably received on the top of the base mounting block 17, and guidingly received in the front end portion of the cavity 34 in the handle and lever mounting block 33 which is affixed to the base block 17. This retractor block front leg 32 has an upwardly opening notch 31A therein receiving the plunger extension 28 through it. The extension has a washer 29 secured to it. The washer engages the rear face 32R of leg 32 adjacent the notch 31A, so that the retractor is capable of pulling the plunger to the left. The width of the space between the legs 31 is greater than the diameter of the washer. Therefore, the plunger can be moved to the left a greater distance than the distance in space 31B from the rear face 32R to the front edges of the legs 31. This provides room for any amount of plunger movement required to cause not only full scale readings on the dial indicator, but also several total revolutions of the pointer on the indicator, to enable the reading of any dimension within the greatest variation of dimensions of the parts to be measured with one setting of the gage. The upper part of the retracting block 30 has a return spring therein and which will be described herein. It urges the block 30 against the front end of the lever 37 which pivots at 38 in the block 33, for a purpose which will be described. A bolt 39 is secured in the block 33 and has the head 41 thereon. A handle 42 is slidably received on the bolt and has a lower flange 43 thereon. The lower face 44 of the flange engages an upwardly facing cam surface 46 of the lever 37. It also normally rests on the top of the block 33. When the assembly is in this position, the indicator plunger is extended in the normal position where it could be making a measurement on a part when positioned between the anvil 47 and the plunger tip 27.

The retracting block has a longitudinally extending blind hole 48 in the front and extending toward the rear. A return coil spring 49 is received in this hole. It pilots on the stem 51 in the rear end of the set screw 52 threadedly received in the block 33. One end of the spring abuts the rear end of the hole in the block 30, and the other end of the spring abuts the rear end of the screw 52, whereby the spring urges the block 30 to the left, against the lever, as mentioned above. The amount of force can be adjusted by adjusting the screw 52.

The anvil carrier assembly 15 includes a locator base 53 into which the threaded body 54 of the anvil is threaded. There is a wrench receiver socket 55 in the end of the anvil opposite the end at which the head of the anvil is located. The longitudinal position of the anvil in the assembly can be closely adjusted in this manner. The position of the screw can be fixed by the set screw 56 threaded into the bottom of the base 53. Two socket-head cap screws 57 and 58 are threaded into the base 53 from above, and seat on the top of the base. The heads of these cap screws are precisely sized as they serve as the locating dowels in the locating apertures of the bar 11.

Two posts 61 are mounted to the base 53. Each of these is a shoulder screw screwed into the base and having a first shoulder 62 abuttingly engaging the top of the base 53. In this way, these screws are tightened against, and permanently fixed to the base. A slide 63 is mounted on the bar 11. It has the shape of an inverted "U", with the inside side walls of the "U" engaging the sides of the bar, and the inside top of the "U" resting on the top of the bar. There is a close sliding fit between the sides and top of the bar, and the sides and top of the inverted "U" of the slide. The slide also has apertures therein which receive the posts 61 through them. The slide has spring pockets 64 in it. These receive springs 66 which extend out the top of the slide and support the hanger 67.

The hanger has a pair of apertures in it and which receive the posts through them. Each aperture has a counterbore at the top which receives a collar 65 in it. The collar has a top edge 65A which receives and supports the head at the upper end of the post 61 extending through the collar. A clamping bolt 68 is screwed into the hanger, and has a knurled knob 69 at the top. Screws 70 threaded into the hanger 67 engage the posts at the grooved portion of the post and are tight enough against the post to enable a downward force, when applied to the hanger, to force downward the posts, and thereby the base 53.

Operation

In the use of the gage assembly, the anvil carrier clamp knob is turned counterclockwise to withdraw the lower end of the bolt 68 into the hanger 67. Then the hanger is pushed downward toward the bar 11. The posts 61 are thereby pushed downward, pushing the base downward to release the locator screw heads 57H and 58H from the locator apertures in the bar 11. Then the carrier assembly can be slid along the bar to the position where it will be most suitable for measuring the size of part which is to be measured. Then the downward force on the hanger is relaxed, whereupon the screw heads 57H and 58H will engage the bottom of the bar, or enter a pair of apertures if the proper alignment has been obtained. If they do not immediately enter a pair of apertures, the base is slid along the bar to the extent needed to obtain the desired alignment, whereupon they will enter a pair of apertures. Then the knob is turned clockwise to tighten the bolt 68 against the bar, and the base 53 is thereby clamped against the bottom of the bar.

Then the gage assembly can be lifted by one hand on the knob, and the other hand on the handle 42. Because of the space in the top of the handle under the bolthead 41, the handle will rise from the top of the block 33. This releases the lever 37, so the force of the spring 49 will pivot the lever clockwise, keeping the cam surface engaged with the bottom of the flange 43. At the same time, the face 32R of the retractor block is driving the dial indicator plunger in a retracting mode and will do so until the plunger is retracted sufficiently for the tip 27 to be flush with or slightly behind the face 17F of the block 17. Then the assembly can be placed over and settled on the top of a master gage bar or block of known dimension. The anvil 47 is located against one edge of the master, and the dial indicator tip 27 is positioned to face the other edge of the master. Then the handle is released. This enables the handle to settle down on the cam 46, and the weight of the handle, combined with the internal spring of the dial indicator itself, will force the retractor block forward, to the right in the drawing, and the plunger tip can then engage the master. Then the indicator dial can be set in the usual way to provide the proper reading of the master dimension. The anvil can be adjusted too for this purpose, if needed. Then the gage assembly can be lifted off the master by the use of the handle on the left to retract the plunger, and lifting the right-hand end with the knob, or otherwise. The gage is then moved to a part to be measured, and placed on it for measuring in the same way as it was placed on the master.

The present invention enables the use of a very conventional dial indicator gage without any modification of the gage itself, and in a convenient and effective way. Most of the parts of the gage of this invention can be conveniently made of aluminum for low cost and light weight. The bar can be two feet long, for example.

Some alternative construction features which may be mentioned here include use of a spring in addition to or instead of the weight of the handle, to retract the plunger. Also, instead of two rows of holes and associated detent pins, a series of longitudinally spaced grooves transverse to the length of the bar could be used, and receive a detent bar or ball mounted to the base 53. Therefore, while the invention has been illustrated and described in detail in the drawings and foregoing description, this is to be considered as illustrative and not restrictive in character, the invention being defined in the following claims.

The invention claimed is:

1. A gage assembly comprising:
an elongate bar for bridging a part to be measured;
contact means provided at spaced locations on said bar and comprising an anvil to engage one margin of a part to be measured, and a gage operating plunger having a plunger tip to engage an opposite margin of the part to be measured; and
a retractor assembly mounted at one end of the bar and located entirely outside the space between said anvil and plunger tip, said retractor assembly including a plunger retractor engageable with said plunger, and handle means operatively associated with said plunger retractor to enable said retractor to automatically retract the said plunger tip when the gage assembly is lifted by said handle means to place said gage assembly onto the part to be measured or to remove said gage assembly from the part to be measured.

2. The assembly of claim 1 and further comprising:

a dial indicator gage supported by said bar and having said plunger with said tip at an end thereof;

the plunger retractor being engageable with a portion of the plunger opposite the tip when the gage assembly is lifted to place it onto the part to be measured or to remove it from the part to be measured.

3. The gage assembly of claim 1 wherein said retractor assembly further comprises:

base means secured to said bar;

a slide received on said base means;

biasing means operating on said slide and said base means and urging said slide in a direction such as to retract the plunger tip toward the gage; and cam means engaging said slide;

said handle means being mounted on said base means and engaging said cam means and operable to enable said slide to retract said plunger when the handle means are lifted.

4. The gage assembly of claim 3 wherein:

said cam means include a lever pivotally mounted to said base means and having one portion engaging said slide, and a cam surface engaging a portion of said handle.

5. The gage assembly of claim 4 wherein:

said gage is a dial indicator gage having said plunger with said tip at the end thereof;

said dial indicator gage plunger is internally spring loaded; and the combination of the weight of the handle means, the lengths of the lever arms of the lever, and the shape of the cam surface of the lever is such as to overcome the urging of said biasing means sufficiently, when said handle is resting on said cam surface, to enable the internal spring loading of the plunger means to extend the plunger tip away from said indicator and into position for engagement with a part to be measured.

6. The gage assembly of claim 5 wherein:

said slide has a cavity therein;

said base means has a spring adjusting screw therein;

said biasing means including a spring located in said cavity and seated against the end of said cavity and against the adjusting screw, said screw being threadedly received in said base means and operable upon turning it in said base means to adjust the amount of urging of said spring against said slide.

7. The assembly of claim 5 wherein:

the engagement of said retractor assembly with the portion of said plunger means is such as to enable force transmission by said plunger means to said retractor assembly in only one direction lengthwise of the plunger means, to thereby avoid loading of the dial indicator gage by the handle means during the measurement of a part.

8. The gage assembly of claim 1 wherein:

the anvil is mounted to a carrier which is slidable along the bar.

9. The gage assembly of claim 8 wherein:

said bar has a plurality of precision apertures in two rows and spaced along the length of the bar;

said carrier has at least two dowel pins secured therein, said pins being receivable in any of the said apertures to precisely locate the carrier lengthwise of the bar; and said carrier has clamping means thereon whereby said carrier can be secured to the bar in any desired longitudinal position thereon.

10. The assembly of claim 9 wherein said carrier includes:

a slide bearing on said bar;

spring means on said slide;

hanger means supported by said spring means;

said hanger means supporting a carrier base against the bar, said pins being secured in the base;

said springs accommodating intentional separation of the base from the bar when desired to slide the carrier along the bar to relocate the pins in different apertures along the bar.

11. A gage assembly comprising:

an elongate bar for bridging a part to be measured;

first and second contact means provided at spaced locations on said bar whereby said first contact means is disposed to engage one margin of a part to be measured, and said second contact means is disposed to engage an opposite margin of the part to be measured;

a gage operatively coupled to said second contact means; and a retractor assembly mounted to said bar entirely outside the space between said first and second contact means and including a contact means retractor engageable with said second contact means, and handle means operatively associated with said contact means retractor to enable said retractor to retract said second contact means when the gage assembly is lifted by means of said handle mens to place the gage assembly onto the part to be measured or to remove said gage assembly from the part to be measured.

* * * * *